(12) United States Patent
Godowski et al.

(10) Patent No.: US 12,373,223 B2
(45) Date of Patent: Jul. 29, 2025

(54) SYSTEM AND METHOD FOR VALIDATION AND CORRECTION OF METADATA IN CONTAINERIZED SOFTWARE ENVIORNMENTS

(71) Applicant: International Business Machines Corporation, Armonk, NY (US)

(72) Inventors: Piotr P. Godowski, Cracow (PL); Szymon Kowalczyk, Cracow (PL); Kacper Krzyżak, Cracow (PL); Lukasz Józef Matyasik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 18/110,450

(22) Filed: Feb. 16, 2023

(65) Prior Publication Data

US 2024/0281260 A1  Aug. 22, 2024

(51) Int. Cl.
*G06F 9/445* (2018.01)
*G06F 16/908* (2019.01)

(52) U.S. Cl.
CPC ........ *G06F 9/44505* (2013.01); *G06F 16/908* (2019.01)

(58) Field of Classification Search
CPC .............................. G06F 9/445; G06F 9/44505
See application file for complete search history.

(56) References Cited

U.S. PATENT DOCUMENTS

| 11,113,301 | B1 | 9/2021 | Modestino et al. | |
|---|---|---|---|---|
| 11,163,557 | B2 | 11/2021 | Babol et al. | |
| 11,321,188 | B2 | 5/2022 | Mitkar et al. | |
| 11,831,729 | B2* | 11/2023 | Herzog | G06F 18/22 |
| 2016/0373327 | A1* | 12/2016 | Degioanni | G06F 11/3093 |
| 2020/0082071 | A1* | 3/2020 | Cherny | G06F 21/604 |
| 2021/0165876 | A1* | 6/2021 | Gerebe | G06F 21/44 |
| 2022/0083629 | A1 | 3/2022 | Condon | |
| 2023/0319112 | A1* | 10/2023 | Kaimal | H04L 63/20 726/1 |
| 2023/0367883 | A1* | 11/2023 | Bussell | G06F 21/577 |

OTHER PUBLICATIONS

Cerrada, "Shielding your Kubernetes runtime with mage scanning on admission controller", Sysdig.com, Feb. 18, 2021, https://sysdig.com/blog/image-scanning admission-controller/.
Rice, "Starboard: the Kubernetes-Native Toolkit for Unifying Security", Jun. 1, 2020, Aqua Blog, https://blog.aquasec.com/starboard-kubernetes-tools.

* cited by examiner

*Primary Examiner* — Raymond N Phan
(74) *Attorney, Agent, or Firm* — CHIP LAW GROUP

(57) ABSTRACT

An example operation may include one or more of identifying a pod that is within a namespace of a host platform, reading a file from a metadata storage of the pod, wherein the file that includes software definition data of the pod, identifying a field within the configuration data of the pod that contains an invalid entry based on a comparison of a value stored in the field to a predefined list of annotations, and in response to the identification of the invalid field, generating and store a log entry into a log of the pod which identifies the invalid field.

17 Claims, 12 Drawing Sheets

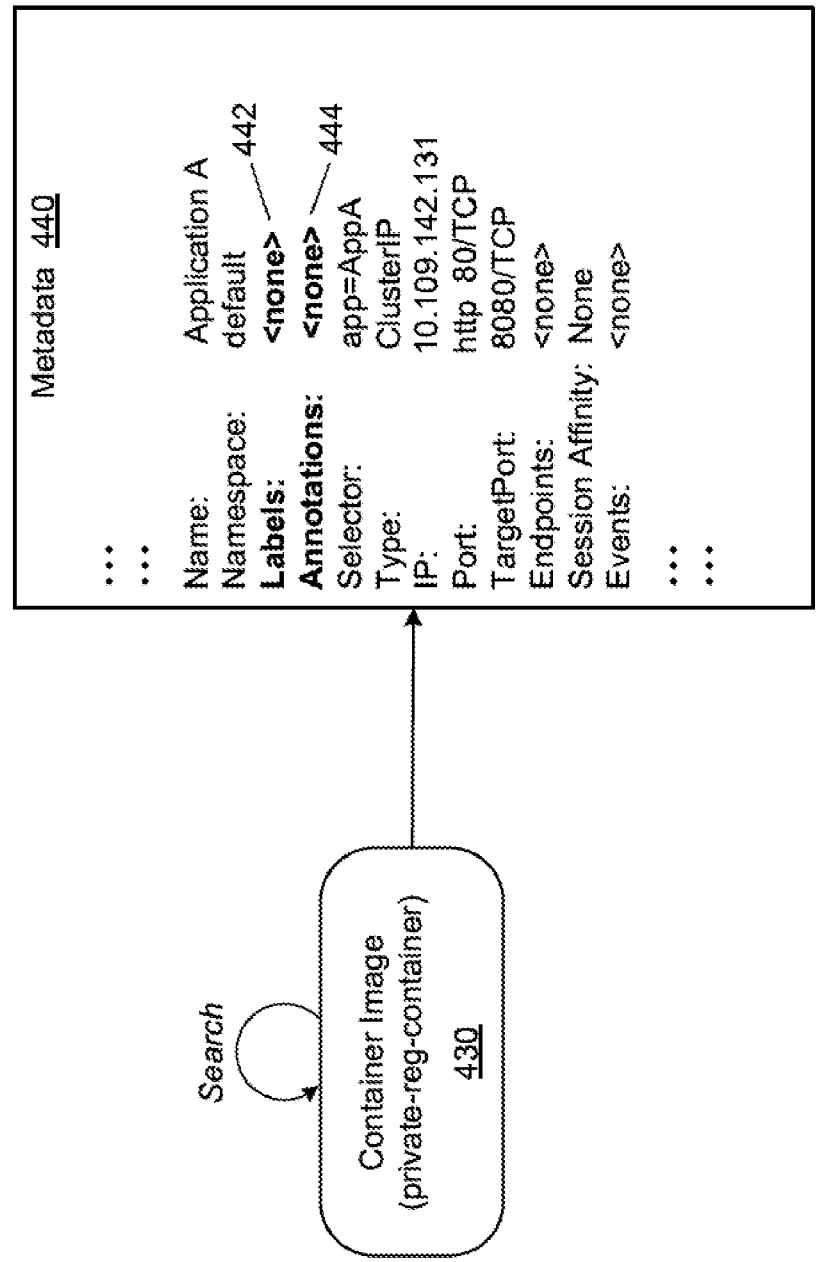

SYSTEM AND METHOD FOR VALIDATION AND CORRECTION OF METADATA IN CONTAINERIZED SOFTWARE ENVIORNMENTS

BACKGROUND

Containerized applications have recently become popular in large scale processing environments. While virtual machines virtualize an entire machine down to the hardware, containers only virtualize the software layers above the operating system level. As a result, containers require less system resources than traditional virtual machines because the applications do not include an operating system image.

SUMMARY

One example embodiment provides an apparatus that includes a processor that may be configured to identify a pod that is within a namespace of a host platform, read a file from a metadata storage of the pod, wherein the file comprises configuration data for software within the pod, identify a field within the configuration data that contains an invalid entry based on a comparison of a value stored in the field to a predefined list of annotations, and in response to the identification of the invalid field, generate and store an entry within a log of the pod which identifies the invalid field.

Another example embodiment provides a method that may include identifying a pod that is within a namespace of a host platform, reading a file from a metadata storage of the pod, wherein the file comprises software definition data of the pod, identifying a field within the software definition data that contains an invalid entry based on a comparison of a value stored in the field to a predefined list of annotations, and in response to the identification of the invalid field, generating and storing an entry within a log of the pod which identifies the invalid field.

A further example embodiment provides a computer-readable medium comprising instructions, that when read by a processor, may cause the processor to perform one or more of identifying a pod that is within a namespace of a host platform, reading a file from a metadata storage of the pod, wherein the file comprises software definition data of the pod, identifying a field within the software definition data that contains an invalid entry based on a comparison of a value stored in the field to a predefined list of annotations, and in response to the identification of the invalid field, generating and storing an entry within a log of the pod which identifies the invalid field.

and 2B is a diagram illustrating another process of tracking and correcting metadata for software detection and licensing, according to example embodiments.

Figure 3A:
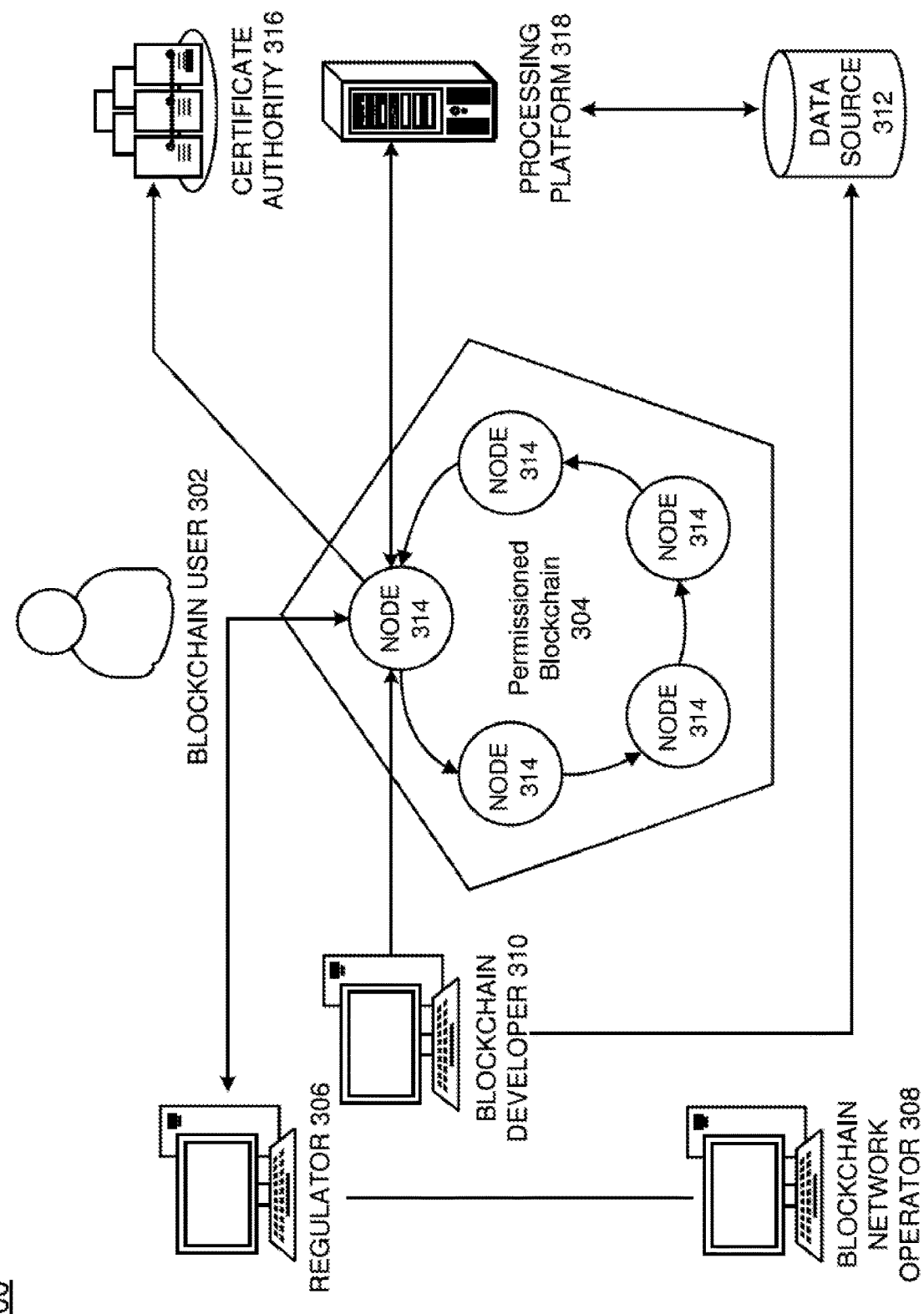

FIG. 3A is a diagram illustrating a permissioned network, according to example embodiments.

Figure 3B:
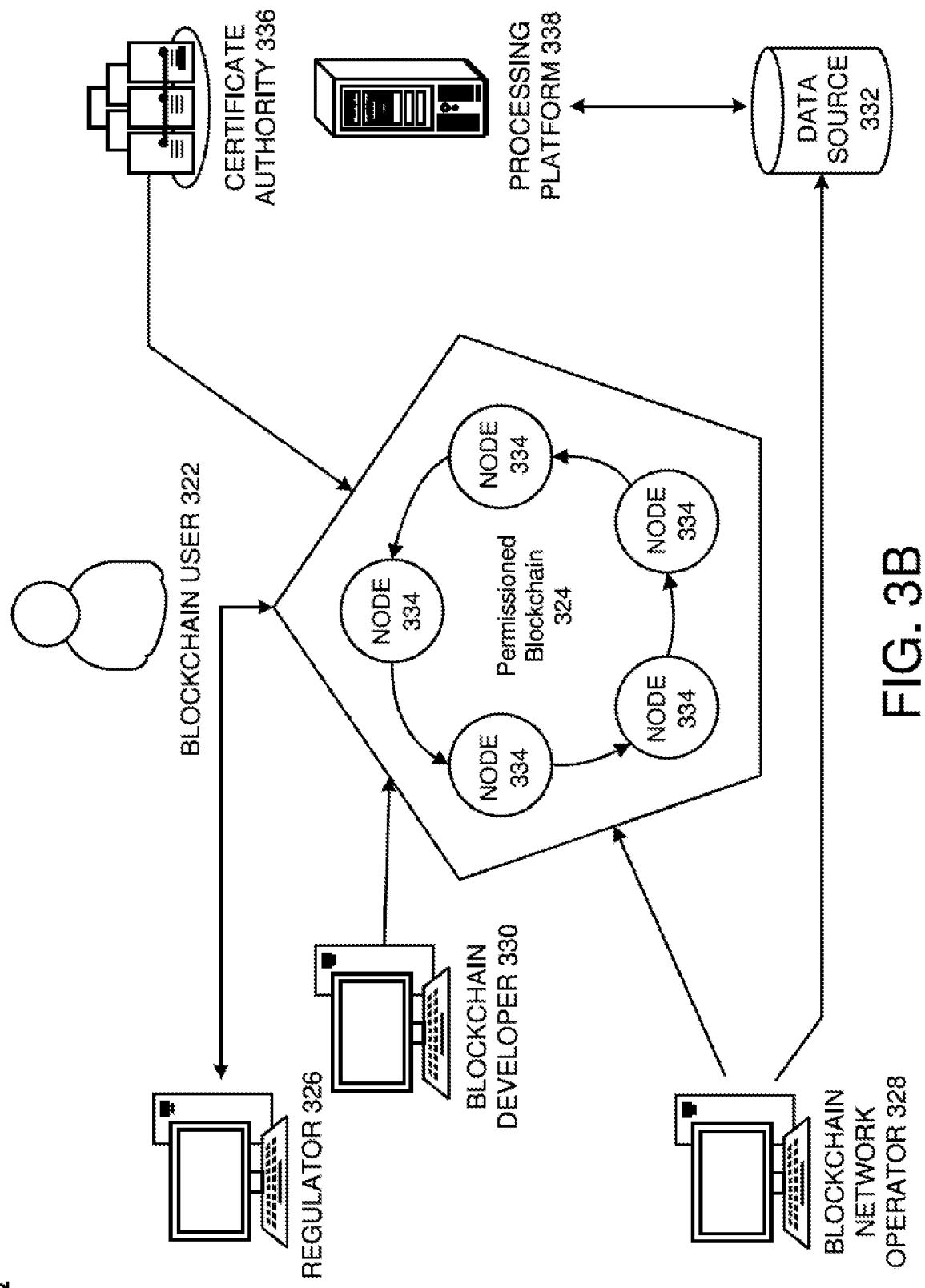

FIG. 3B is a diagram illustrating another permissioned network, according to example embodiments.

Figure 3C:
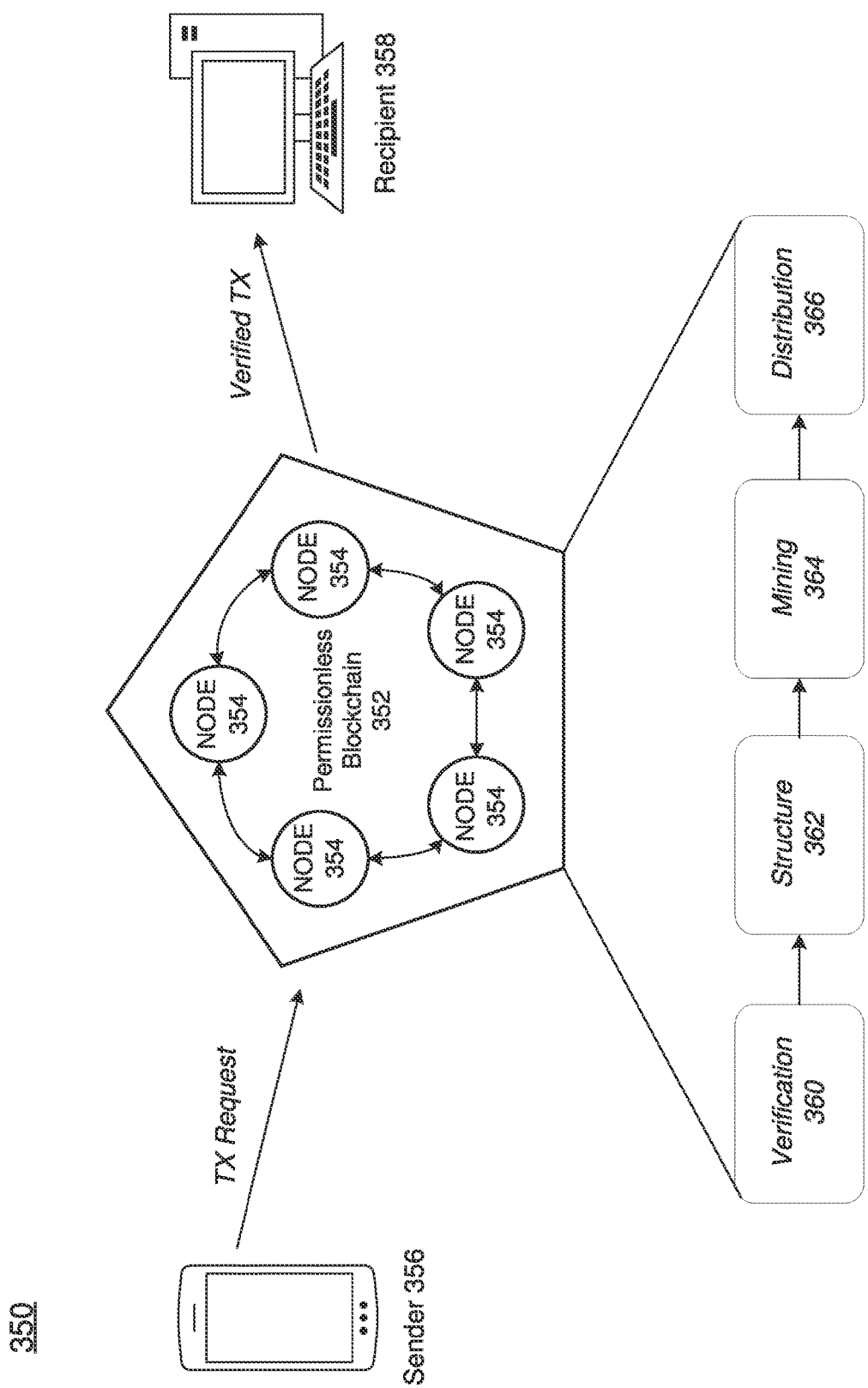

FIG. 3C is a diagram illustrating a further permissionless network, according to example embodiments.

Figure 3D:
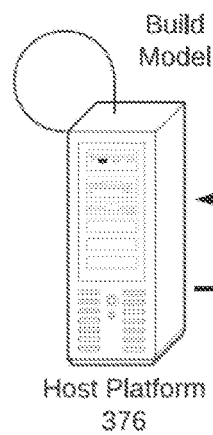
Figure 3D:
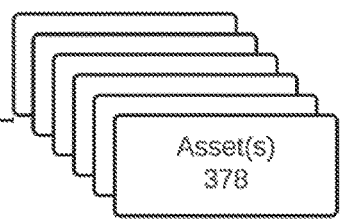
Figure 3D:
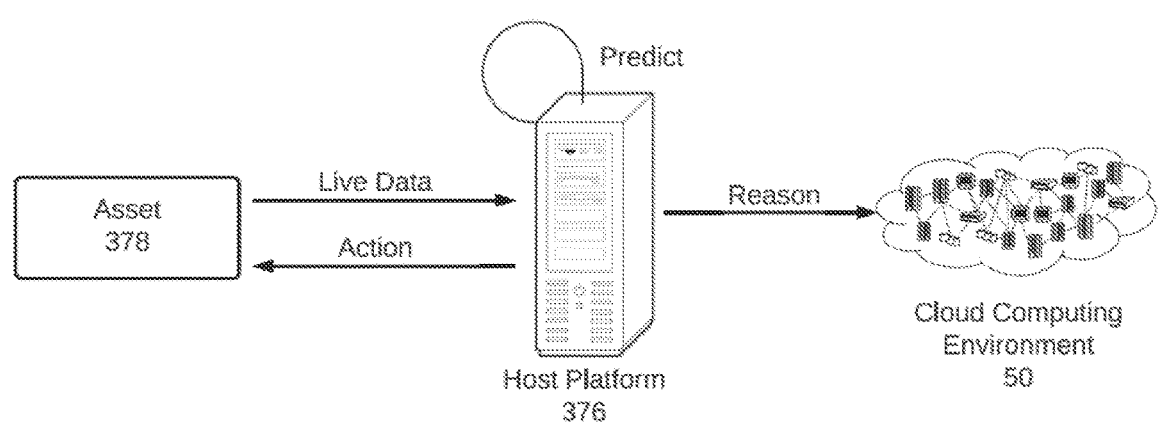

FIG. 3D is a diagram illustrating machine learning process via a cloud computing platform, according to example embodiments.

Figure 3E:
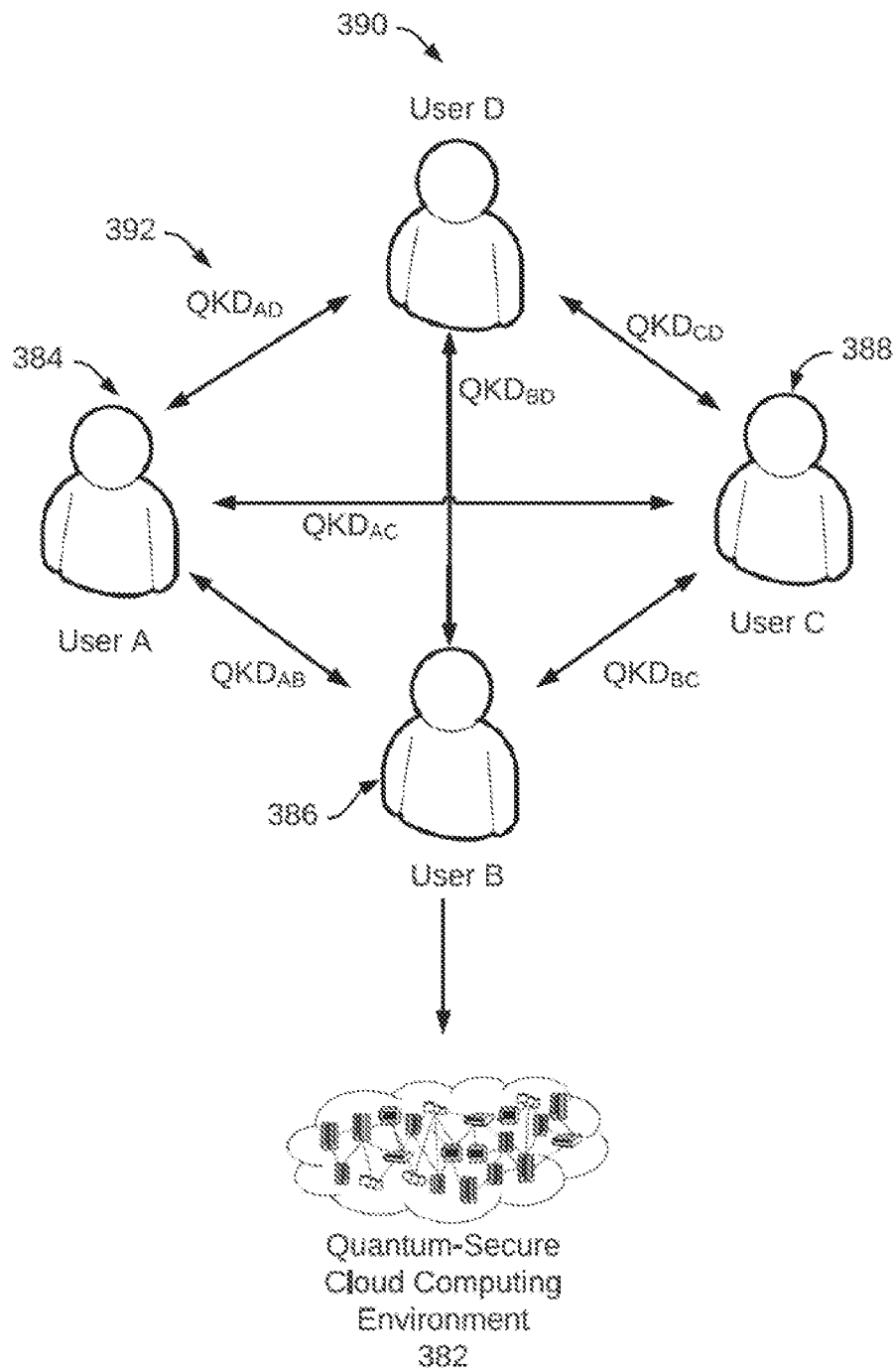

FIG. 3E is a diagram illustrating a quantum computing environment associated with a cloud computing platform, according to example embodiments.

Figure 4A:
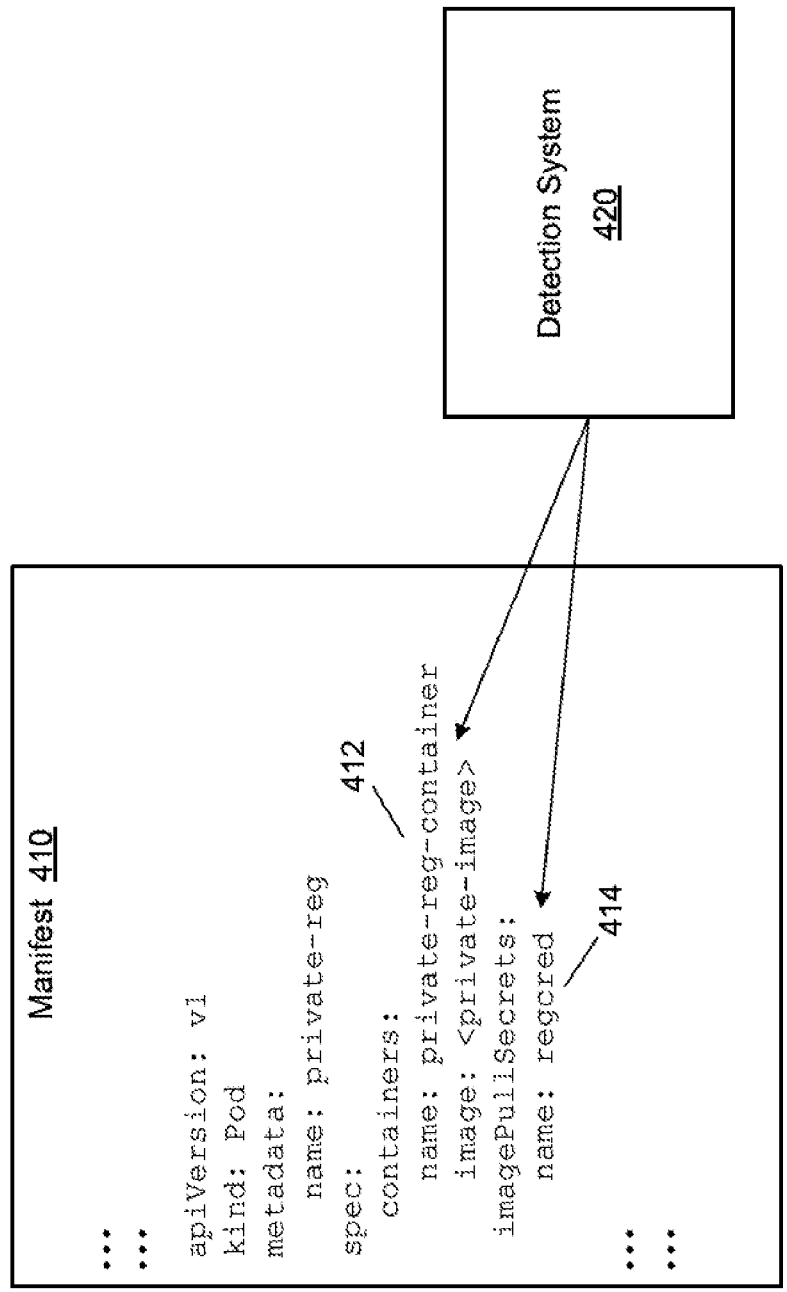

FIG. 4A is a diagram illustrating a process of identifying containers currently running within a pod, according to example embodiments.

FIG. 4B is a diagram illustrating a process of identifying metadata from a pod of a host environment, according to example embodiments.

Figure 4C:
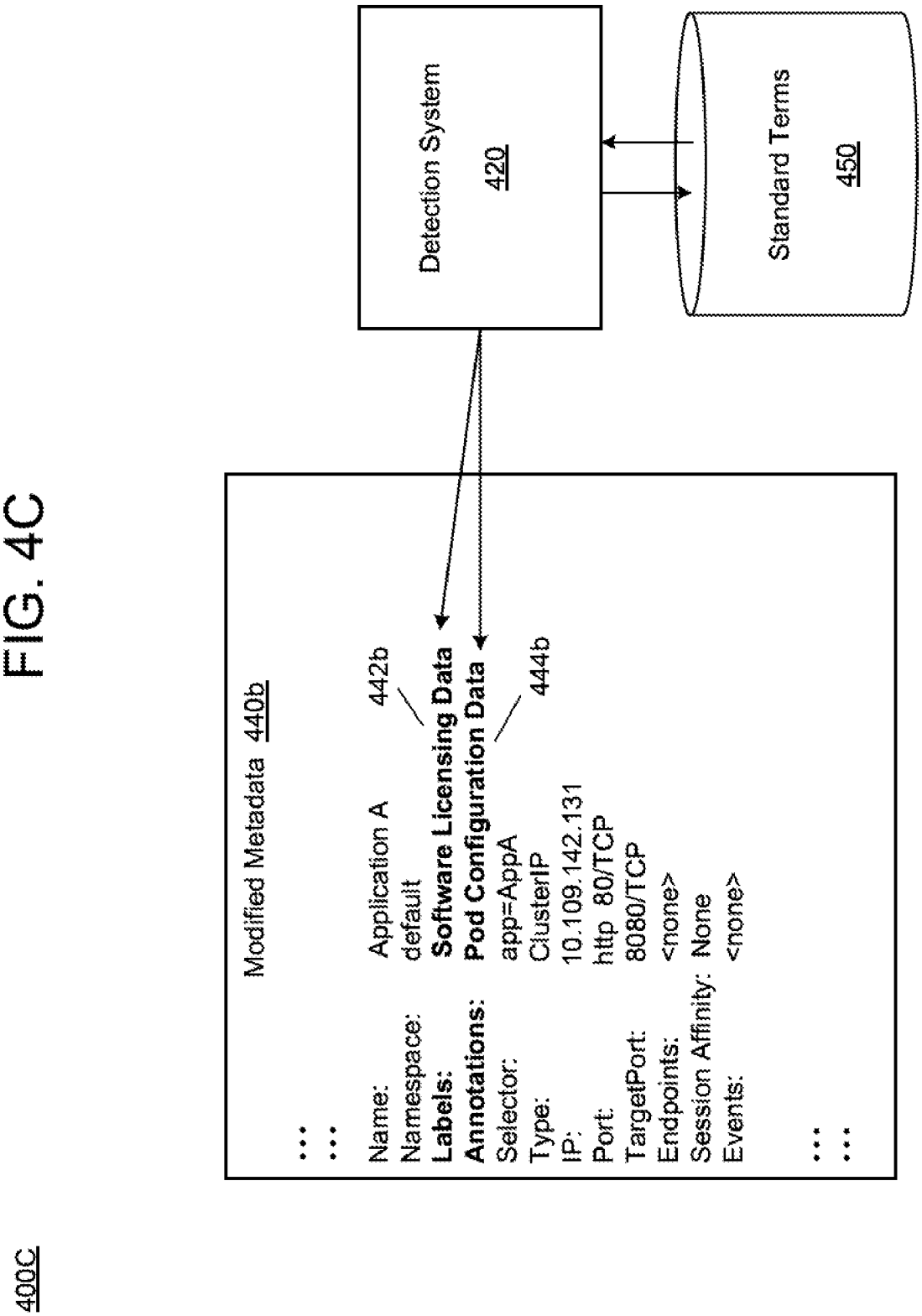

FIG. 4C is a diagram illustrating a process of correcting the metadata of the pod within the host environment, according to example embodiments.

Figure 5:
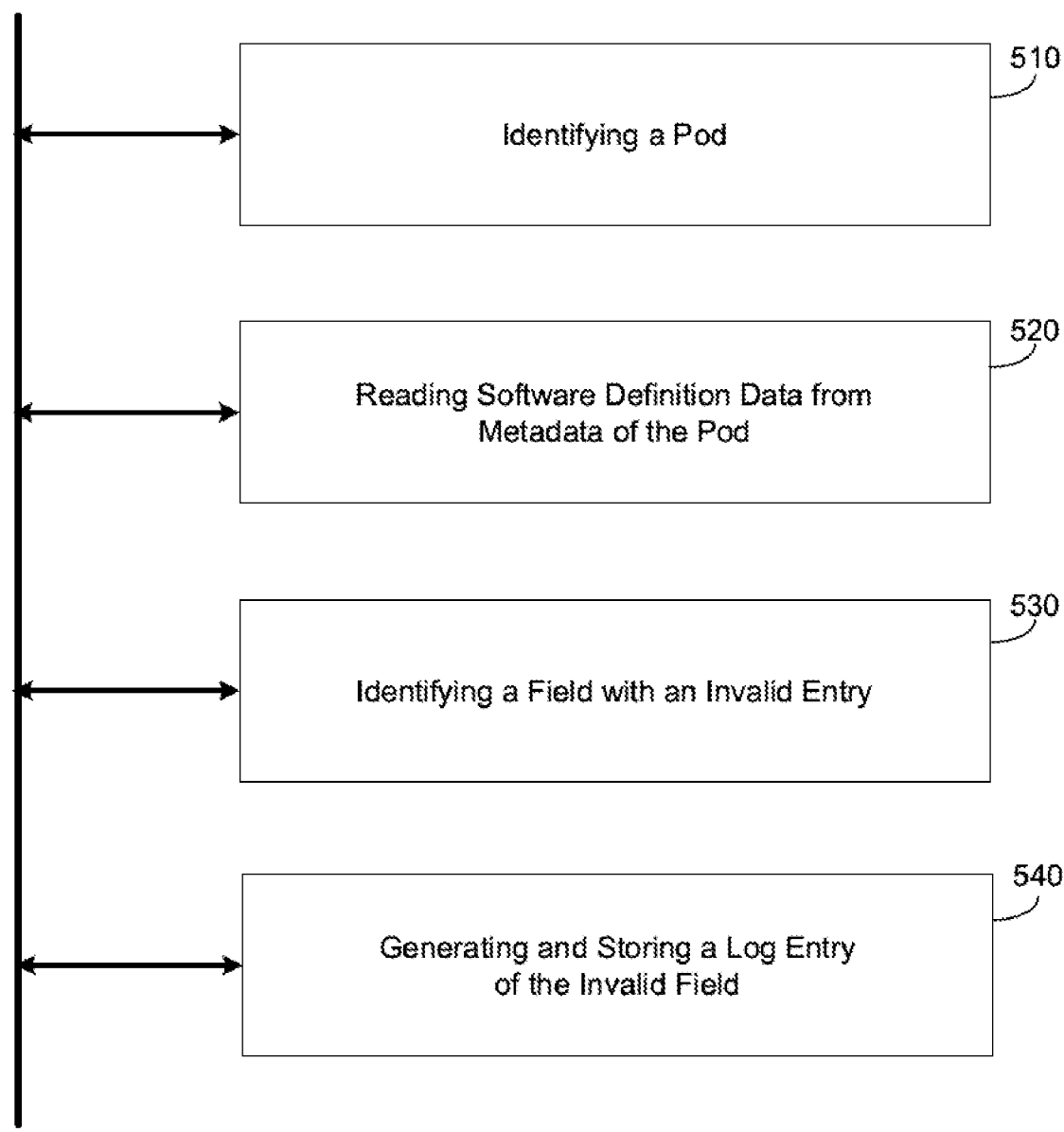

FIG. 5 is a diagram illustrating a method of identifying invalid metadata for software detection, according to example embodiments.

DETAILED DESCRIPTION

It is to be understood that although this disclosure includes a detailed description of cloud computing, implementation of the teachings recited herein is not limited to a cloud computing environment. Rather, embodiments of the present solution are capable of being implemented in conjunction with any other type of computing environment now known or later developed.

The example embodiments are directed to a system that can scan configuration metadata of a pod environment for attributes of the pod and compare the attributes to standard definitions defined in advance. In doing so, the system can identify missing and invalid configuration data within the pod. The system may also correct the data in its place within the pod storage thereby enabling other programs within the pod environment to properly identify the configuration data of the pod. The configuration data may be attributes of an automation product that is used to launch the pod such as a name, a product serial number, or other identifier, of the automation product. The configuration data may include attributes of a server where the pod is deployed. The configuration data may also include software definition data of software applications, services, etc., that are running within the pod.

For example, the system may detect when a name of a server that launched the pod is incorrectly listed within the metadata and correct it. For example, a server name within the pod metadata may be specified as "Application Server ABCD". However, the actual server name where the pod is hosted may be "Test Server 123". The incorrect value may be the result of a developer error or other negligence that occurs often in the software development industry. In this case, the system can automatically identify and correct invalid values of the configuration data which are used for software detection, compliance tracking, licensing, and the like. In doing so, the system enables better visibility of the pod to the software programs that are hosted therein. For example, each of the software programs may query the pod for the metadata and obtain the metadata corrected by the system described herein.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

As the popularity of containerized applications has increased, so to have the customizations to applications and containers that host them. For example, many applications are customized by the company's application development and integration teams. Unfortunately, customized containers may miss some characteristics, metadata or annotations that are used for software detection and license tracking. When not able to be found, the missing features make it difficult to detect what applications are running on the host platform and the compliance requirements thereof.

Figure 1:
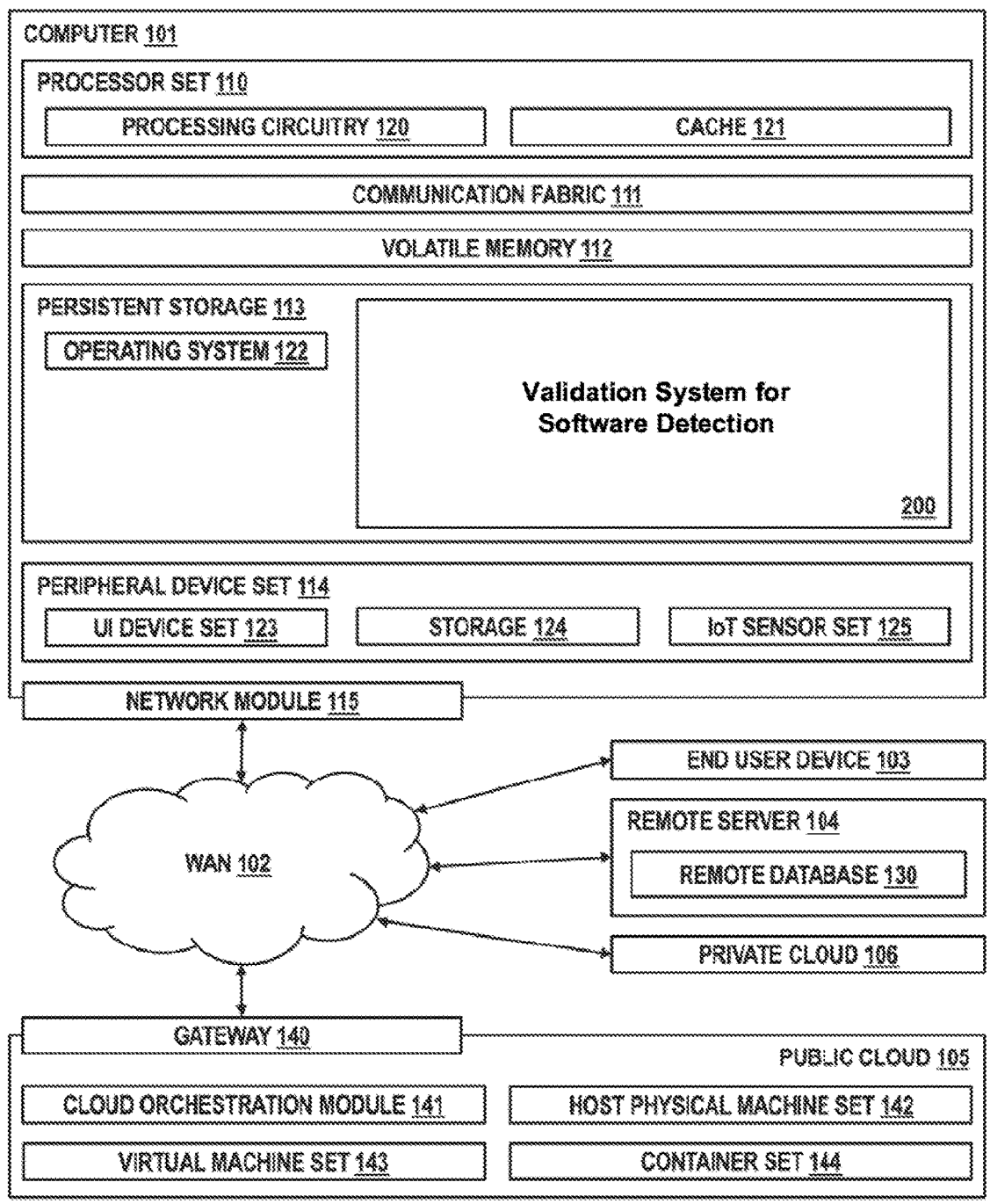
FIG. 1 is a diagram illustrating a computing environment, according to example embodiments.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as validation system for software detection 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 2A:
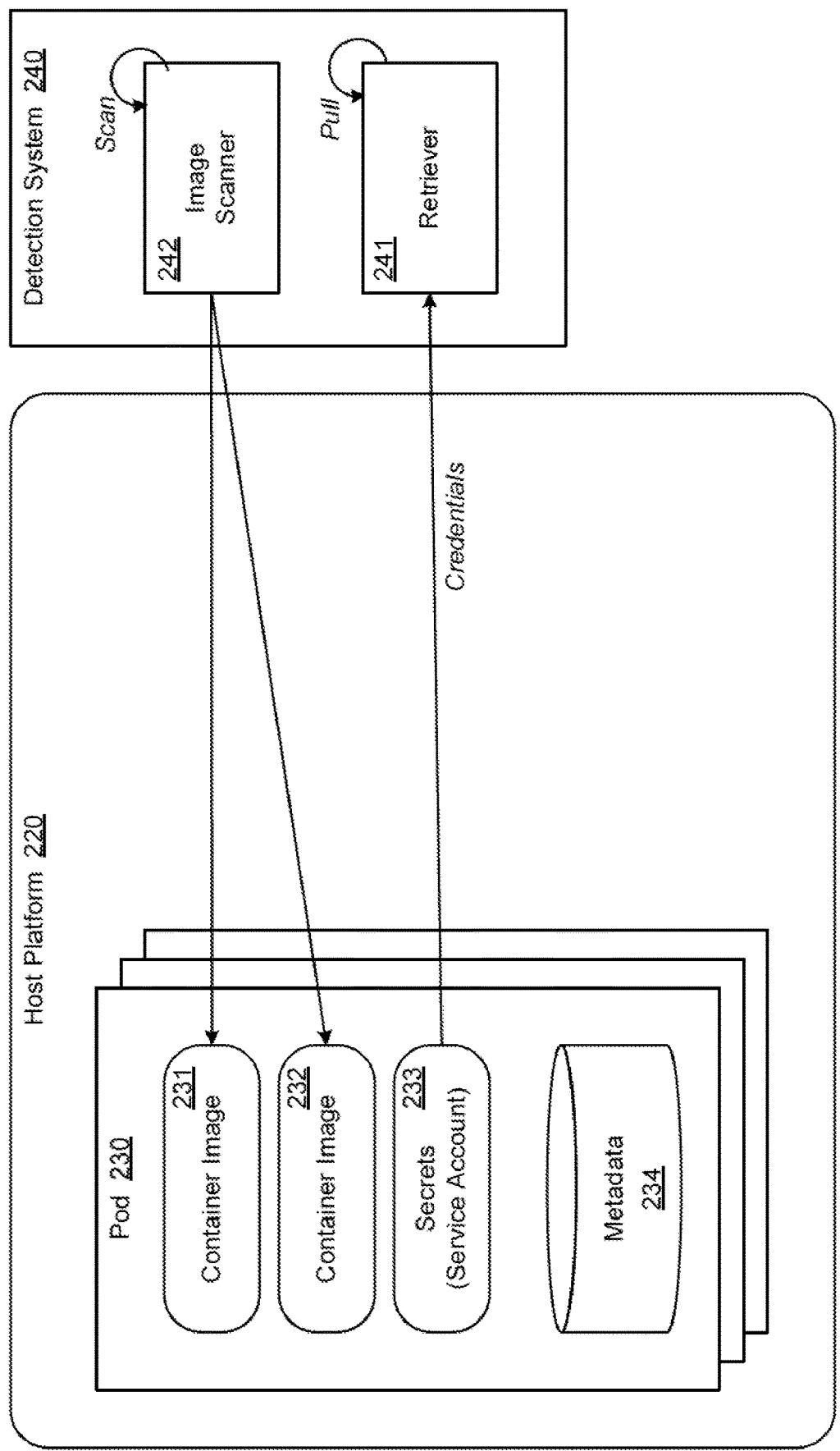
FIG. 2A is a diagram illustrating a process of tracking and correcting metadata for software detection and licensing, according to example embodiments.
Figure 2B:
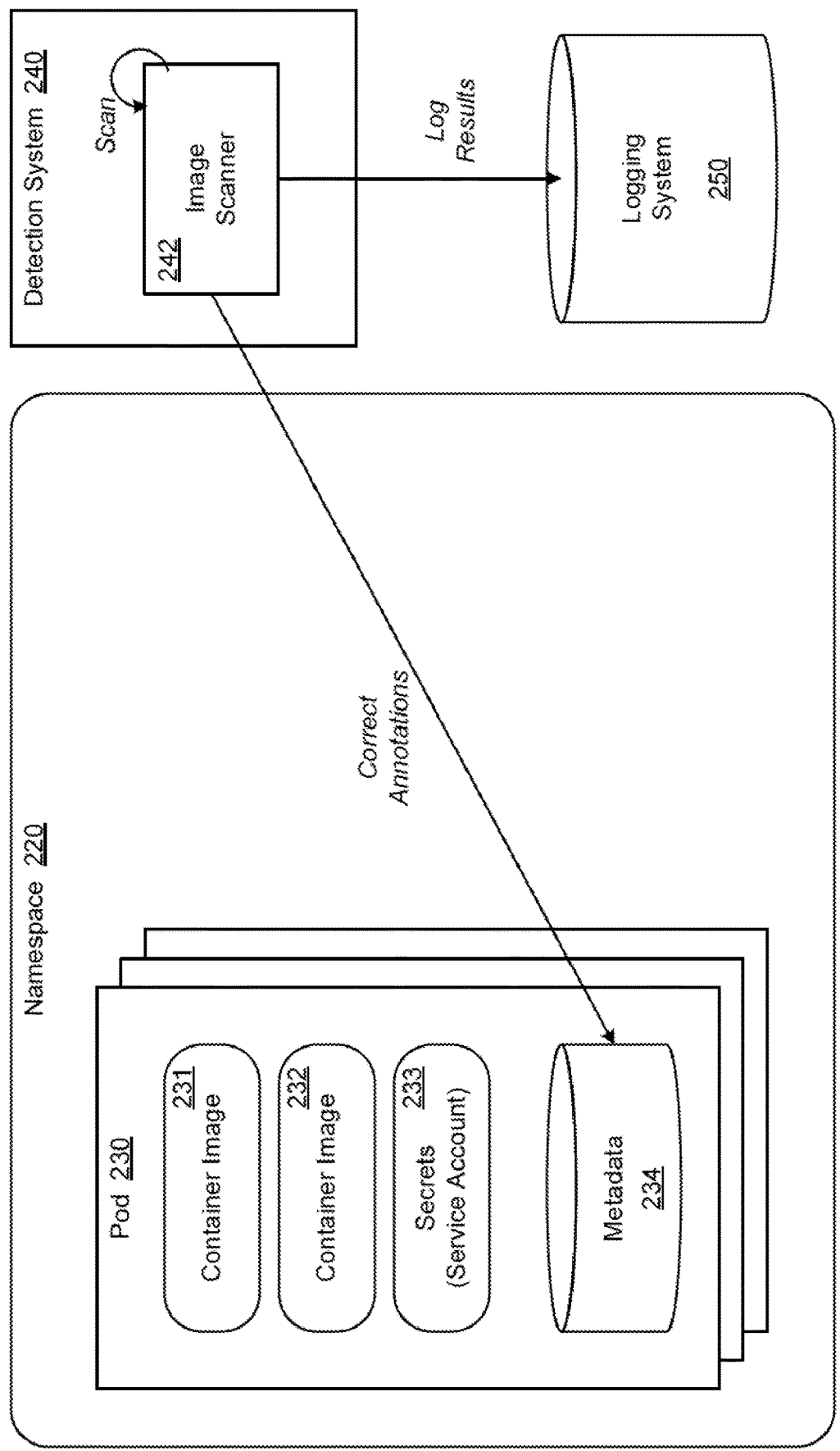

FIG. 2A illustrates a process 200A of identifying incorrect metadata for software detection and licensing according to example embodiments, and FIG. 2B illustrates a process 200B of correcting the incorrect metadata found in the process of FIG. 2A, according to example embodiments. Referring to FIGS. 2A and 2B, a host platform 220 hosts a namespace with one or more pods located therein. In the example of FIG. 2A, a pod 230 is deployed on the host platform 220. The pod 230 represents a smallest deployable object in a KUBERNETES® system. The pod 230 may contain one or more containers (with one or more applications enclosed therein). The containers within the same pod may share a storage (e.g., a persistent volume, etc.) and resources including nodes and network bandwidth. Grouping containers in this way, enables each of the applications therein to communicate between each other as if they share the same physical hardware, while also maintaining isolation to some degree by being containerized.

In the example of FIG. 2A, the pod 230 includes two containers (not shown) that are represented by container image 231 and container image 232, respectively. The pod 230 also includes a secret 233 (which may include access credentials) that can be read from metadata storage of the pod 230 and used to pull the container images 231 and 232 from a repository of the pod 230. In this example, the host platform 220 also hosts a detection system 240 (e.g., a software application, etc.) that is configured to read metadata from the pod 230 and the namespace in which it is located, and correct incorrect and missing values therein. In this example, the detection system 240 includes a retriever 241 configured to scan the metadata of the pod 230 and identify any secrets 233 that can be used for pulling container images. Next, the retrieve 241 may retrieve the secrets 233 from the pod storage.

Referring now to FIG. 2B, the secrets 233 may include credentials that can be used to receive access/pull a container image from the pod 230. The retriever 241 may provide the secrets 233 to an image scanner 242 which schedules scan jobs for each of the containers and uses the secrets 233 to pull the corresponding image containers 231 and 232, for the scanning process. Here, the image scanner 242 may scan the image containers 231 and 232 for software detection attributes and/or licensing attributes and compare them to a predefined list of software detection and/or licensing attributes. If any of the scanned attributes are different from the attributes in the predefined list, they may be detected as being invalid. In response, the detection system 240 can send an alert, change the value to the correct value in metadata 234 of the pod 230, and the like. The detection system 240 may also record any invalid detections within a logging system 250 of the pod, as well as any alerts and corrective actions undertaken to address the invalidity.

FIG. 3A illustrates an example of a permissioned blockchain network 300, which features a distributed, decentralized peer-to-peer architecture. The blockchain network may interact with the cloud computing environment, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger. Additionally, all parties have the choice of running a node on the system and employing the mining protocols to help verify transactions.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

FIGS. 3D and 3E illustrate additional examples of use cases for cloud computing that may be incorporated and used herein. FIG. 3D illustrates an example 370 of a cloud computing environment, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment. This can significantly reduce the collection time needed by the host platform 376 when performing predictive model training. For example, data can be directly and reliably transferred straight from its place of origin to the cloud computing environment. By using the cloud computing environment to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment by the host platform 376. Each refinement of the machine learning model (e.g., changes in variables, weights, etc.) may be stored in the cloud computing environment to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment. In one embodiment, the features and/or the actions described and/or depicted herein can occur on or with respect to the cloud computing environment.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

FIG. 4A illustrates a process 400A of identifying containers currently running within a pod according to an example embodiment. Referring to FIG. 4A, a detection system 420 according to various embodiments may access metadata of a pod (not shown) to determine the configuration of the pod. In the example of FIG. 4A, the detection system 420 accesses a manifest 410 of the pod with information about the pod including its name, specification, etc. The manifest 410 also identifies that a container 412 is hosted within the pod and an identifier of a pull secret 414 for accessing an image of the container 412 (container image).

FIG. 4B illustrates a process 400B of identifying metadata 440 from a pod of a host environment according to an example embodiment. Referring to FIG. 4B, in this example, a container image 430 of the container 414 identified from the manifest 410 in FIG. 4A, is scanned for software detection attributes and licensing data. For example, the software detection attributes may include one or more attributes of an automation product that is used to launch the pod such as a name, a product serial number or other identifier of the automation product. The attributes may include attributes of a server where the pod is deployed. The configuration data may also include software definition data of software applications, services, etc., that are running within the pod. In this example, the metadata does not include labels 442 or annotations 444. In other words, these fields are blank. It could also be that the fields have incorrect information in there. The software detection system 420 may compare the values in the fields of the metadata 440 to a predefined list of standardized metadata values that have been obtained and learned by the system over time. The predefined list of standardized metadata values may be used to identify incorrect/invalid values that are not a match to the values in the predefined list, and also identify a correct value that can be used to replace the invalid value in the metadata 440.

FIG. 4C illustrates a process 400C of correcting the metadata of the pod within the host environment according to an example embodiment. In particular, the detection system 420 may access a list of standardized terms/values for the modified metadata 440b which is stored in a data store 450 of the host platform. Here, the detection system 420 may compare the values stored in the modified metadata 440b to the values stored in the standard list to determine if they are a match. If not, the detection system 420 identifies the value as invalid and can suggest the correct value from the predefined list. The detection system 420 can automatically correct the invalid value as shown in fields 442b and 444b of FIG. 4C.

FIG. 5 illustrates a method 500 of identifying invalid metadata for software detection according to example embodiments. For example, the method may be performed by a cloud platform, a web server, a distributed network of devices and systems, or other computing system. Referring to FIG. 5, in 510, the method may include identifying a pod that is within a namespace of a host platform. As an example, the pod may be hosted via a namespace of a KUBERNETES® cluster, or the like.

In 520, the method may include reading a file from a metadata storage of the pod. In this example, the file may include software definition data of the pod. In 530, the method may include identifying a field within the software definition data that contains an invalid entry based on a comparison of a value stored in the field to a predefined list of annotations. In 540, the method may include, in response to the identification of the invalid field, generating and storing an entry within a log of the pod which identifies the invalid field.

In some embodiments, the method may further include identifying a correct value for the field from the predefined list of annotations and modifying the field within the software definition data stored in the metadata storage of the pod to include the correct value. In some embodiments, the modifying may include modifying an annotation for one or more of a name value, a cloud pak identifier value, a server name value, a product identifier value, and a metric value. In some embodiments, the reading may include reading a software identification (SWID) tag file from the metadata storage of the pod and identifying the invalid field within the SWID tag file.

In some embodiments, the method may further include reading a plurality of container images of a plurality of containers, respectively, from the metadata storage and identifying a plurality of applications that are hosted within the pod based on the plurality of container images. In some embodiments, the method may further include scanning the plurality of container images based on the predefined list of annotations to identify whether any invalid values are stored in the plurality of container images, and storing results of the scanning within configuration files within the metadata storage. In some embodiments, the method may further include transmitting an alert to a user device associated with the pod in response to the identification of the invalid field. In some embodiments, the invalid field may include a field for license tracking of a software program, and the method may further include correcting a value for the license tracking of the software program within the metadata storage based on the predefined list of annotations.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
   a processor configured to:
   identify a pod that is within a namespace of a host platform;
   read a file from a metadata storage of the pod, wherein the file comprises configuration data for software within the pod;
   identify a field within the configuration data that contains an invalid entry based on a comparison of a value stored in the field to a predefined list of annotations;
   in response to the field being identified as invalid field, generate an entry that identifies the invalid field;
   store the entry in a log of the pod; and
   modify the field to include one or more of an identifier of a software product included in the pod, an identifier of an automation product used to launch the pod, an identifier of a host of the pod, or an identifier of a metric used to analyze the pod.

2. The apparatus of claim 1, wherein the processor is further configured to:
   identify a correct value for the field from the predefined list of annotations; and
   modify the field within the configuration data stored in the metadata storage of the pod to include the correct value.

3. The apparatus of claim 1, wherein the processor is configured to:
   read a software identification (SWID) tag file from the metadata storage of the pod and identify the invalid field within the SWID tag file.

4. The apparatus of claim 1, wherein the processor is further configured to:
   from the metadata storage, read a plurality of container images corresponding to a plurality of containers; and
   identify a plurality of applications hosted within the pod based on the plurality of container images.

5. The apparatus of claim 1, wherein the processor is further configured to:
   transmit an alert to a user device associated with the pod in response to the invalid field being identified.

6. The apparatus of claim 1, wherein the invalid field comprises a field for license tracking of a software program, and
the processor is further configured to:
correct a value for the license tracking of the software program within the metadata storage based on the predefined list of annotations.

7. The apparatus of claim 4, wherein the processor is further configured to:
scan the plurality of container images based on the predefined list of annotations to identify any invalid values stored in the plurality of container images; and
store results of the scan in configuration files in the metadata storage.

8. A method comprising:
identifying a pod that is within a namespace of a host platform;
reading a file from a metadata storage of the pod, wherein the file comprises software definition data of the pod;
identifying a field within the software definition data that contains an invalid entry based on a comparison of a value stored in the field to a predefined list of annotations;
in response to the field being identified as invalid field, generating an entry that identifies the invalid field;
storing the entry in a log of the pod; and
modifying the field to include one or more of an identifier of a software product included in the pod, an identifier of an automation product used to launch the pod, an identifier of a host of the pod, or an identifier of a metric used to analyze the pod.

9. The method of claim 8, wherein the method further comprises:
identifying a correct value for the field from the predefined list of annotations; and
modifying the field within the software definition data stored in the metadata storage of the pod to include the correct value.

10. The method of claim 8, wherein the reading comprises:
reading a software identification (SWID) tag file from the metadata storage of the pod and identifying the invalid field within the SWID tag file.

11. The method of claim 8, wherein the method further comprises:
from the metadata storage, reading a plurality of container images corresponding to a plurality of containers; and
identifying a plurality of applications hosted within the pod based on the plurality of container images.

12. The method of claim 8, wherein the method further comprises:
transmitting an alert to a user device associated with the pod in response to the identification of the invalid field.

13. The method of claim 8, wherein the invalid field comprises a field for license tracking of a software program, and
the method further comprises:
correcting a value for the license tracking of the software program within the metadata storage based on the predefined list of annotations.

14. The method of claim 11, wherein the method further comprises:
scanning the plurality of container images based on the predefined list of annotations to identify whether any invalid values are stored in the plurality of container images; and
storing results of the scanning in configuration files in the metadata storage.

15. A computer-readable storage medium comprising instructions that, when executed by a processor, cause the processor to perform:
identifying a pod that is within a namespace of a host platform;
reading a file from a metadata storage of the pod, wherein the file comprises software definition data of the pod;
identifying a field within the software definition data that contains an invalid entry based on a comparison of a value stored in the field to a predefined list of annotations;
in response to the field being identified as invalid field, generating an entry that identifies the invalid field;
storing the entry in a log of the pod; and
modifying the field to include one or more of an identifier of a software product included in the pod, an identifier of an automation product used to launch the pod, an identifier of a host of the pod, or an identifier of a metric used to analyze the pod.

16. The computer-readable storage medium of claim 15, wherein the instructions further cause the processor to perform:
identifying a correct value for the field from the predefined list of annotations; and
modifying the field within the software definition data stored in the metadata storage of the pod to include the correct value.

17. The computer-readable storage medium of claim 15, wherein the reading comprises:
reading a software identification (SWID) tag file from the metadata storage of the pod and identifying the invalid field within the SWID tag file.

* * * * *